US009676236B2

(12) United States Patent
Tomitaka

(10) Patent No.: US 9,676,236 B2
(45) Date of Patent: Jun. 13, 2017

(54) PNEUMATIC TIRE

(71) Applicant: TOYO TIRE & RUBBER CO., LTD., Osaka-shi, Osaka (JP)

(72) Inventor: Yu Tomitaka, Osaka (JP)

(73) Assignee: TOYO TIRE & RUBBER CO., LTD., Osaka-shi (JP)

(*) Notice: Subject to any disclaimer, the term of this patent is extended or adjusted under 35 U.S.C. 154(b) by 304 days.

(21) Appl. No.: 14/492,456

(22) Filed: Sep. 22, 2014

(65) Prior Publication Data
US 2015/0114540 A1 Apr. 30, 2015

(30) Foreign Application Priority Data
Oct. 25, 2013 (JP) ................................. 2013-222568

(51) Int. Cl.
*B60C 15/06* (2006.01)
*B60C 9/02* (2006.01)
*B60C 15/00* (2006.01)

(52) U.S. Cl.
CPC ...... *B60C 15/0628* (2013.04); *B60C 15/0072* (2013.04); *B60C 15/0009* (2013.04); *B60C 15/06* (2013.01); *B60C 15/0603* (2013.04); *B60C 15/0607* (2013.04); *B60C 2015/0621* (2013.04); *B60C 2015/0625* (2013.04); *B60C 2015/0642* (2013.04); *B60C 2015/0646* (2013.04); *Y10T 152/10819* (2015.01);
(Continued)

(58) Field of Classification Search
CPC . B60C 15/0072; B60C 15/14; B60C 15/0009; B60C 2015/0617; B60C 2015/0621; B60C 2015/0614; B60C 15/024; B60C 15/06; B60C 15/0603; B60C 15/0628; B60C 2015/0625; Y10T 152/10828; Y10T 152/10837

USPC ............................. 152/549, 510, 553
See application file for complete search history.

(56) References Cited

U.S. PATENT DOCUMENTS 4,508,153 A * 4/1985 Tanaka ................. B60C 5/16
152/510
2009/0314408 A1* 12/2009 Taguchi ................ C08L 7/00
152/541

FOREIGN PATENT DOCUMENTS

JP 07-315013 A 12/1995
JP 9-300922 A 11/1997
JP 10024711 A * 1/1998
(Continued)

OTHER PUBLICATIONS

Machine Translation: JP 10024711 A; Suzuki, Akimasa; no date.*
(Continued)

*Primary Examiner* — Michael H Wilson
*Assistant Examiner* — Kendra Ly
(74) *Attorney, Agent, or Firm* — Westerman, Hattori, Daniels & Adrian, LLP

(57) ABSTRACT

A pneumatic tire according to the invention includes: a pair of left and right beads 3 each including a bead cores 3a and bead fillers 3b; a carcass ply 5 extended around the bead cores 3a; and an inner liner 4 arranged on an inner peripheral side of the carcass ply 5, and is characterized in that the carcass ply 5 is wound up around the bead cores 3a from the outside in the direction of width of tire to the inside in the direction of width of tire, and a distortion restraining layer 7 configured to restrain distortion of the winding ends 5a of the carcass ply 5 is provided between the bead fillers 3b and the carcass ply 5 so as to overlap with a wind-up ends 5a of the carcass ply 5.

2 Claims, 1 Drawing Sheet

(52) U.S. Cl.
CPC ............... *Y10T 152/10828* (2015.01); *Y10T 152/10855* (2015.01)

(56) References Cited

FOREIGN PATENT DOCUMENTS

| | | |
|---|---|---|
| JP | 2002-513360 A | 5/2002 |
| JP | 2007-131173 A | 5/2007 |
| WO | 98/52777 A1 | 11/1998 |

OTHER PUBLICATIONS

Office Action dated Mar. 14, 2017, issued in counterpart Japanese Patent Application No. 2013-222568, with English translation. (6 pages).

\* cited by examiner

PNEUMATIC TIRE

BACKGROUND OF INVENTION

1. Technical Field

The present invention relates to a pneumatic tire and, specifically, to a pneumatic tire having a structure in which a carcass ply is wound up from the outside to inside in the direction of width of tire.

2. Background Art

In the related art, pneumatic tires having a structure in which a carcass ply is wound up from the widthwise outer side to inner side of tire, whereby distribution of a tensile force applied to the carcass ply is changed so as to increase a tensile force of a position easy to contribute to tire rigidity, and improve a control stability performance as described in JP-A-2007-131173, JP-A-2002-513360, and JP-A-07-315013 (1995) are known.

JP-A-2007-131173 discloses a pneumatic tire having a structure aiming an improvement of a control stability performance of the tire by having a carcass ply of a single-layer structure and being wound around bead cores from the outside to the inside in the direction of width of tire, arranging ends of the carcass ply inside the bead cores in a radial direction of tire, and winding up the ends of the carcass ply from turn-up positions toward the outside in the radial direction of tire to an extent that the bead cores are not wrapped around.

JP-A-2002-513360 discloses a tire intended to substantially reduce the frequency of occurrence of tire breakage in an early stage with a carcass ply wound up around bead cores from the outside to inside in the direction of width of tire.

JP-A-07-315013(1995) discloses an air radial tire capable of contributing to the weight reduction of the tire and maintenance of tire rigidity without lowering performances such as a control stability or the like by having a configuration that a carcass ply passes through outer surface sides of tire from bead fillers and both ends of the carcass ply are wound up from the outside toward the inside of the bead cores on both sides so as to be supported thereby.

However, since known technologies disclosed in JP-A-2007-131173, JP-A-2002-513360, and JP-A-07-315013 (1995) all have a configuration in which the carcass ply is in direct contact with the bead cores, a tensile force is generated when an inter pressure is applied to the tire, whereby the carcass ply and the bead core are scraped against each other, so that, breakage or deterioration of durability may occur.

SUMMARY OF INVENTION

It is an object of the present invention to provide a pneumatic tire having a structure in which a carcass ply is wound up from the outside to inside in the direction of width of tire, in which durability is improved by restraining distortion of the wind-up end of the carcass ply.

A pneumatic tire according to an aspect of the present invention is a pneumatic tire including: a pair of left and right beads each including a bead core and a bead filler; a carcass ply extended around the bead cores; and an inner liner arranged on an inner peripheral side of the carcass ply, wherein the carcass ply is wound up around the bead cores from the outside in the direction of width of tire to the inside in the direction of width of tire, and a distortion restraining layer configured to restrain distortion of wind-up ends of the carcass ply provided between the bead fillers and the carcass ply so as to overlap with a wind-up ends of the carcass ply.

With the configuration as described above, the pneumatic tire according to the aspect of the present invention is reinforced at the wind-up ends of the carcass ply with the distortion restraining layer, so that the distortion of the wind-up ends of the carcass ply is prevented.

In the configuration described above, a configuration in which the inner liner is wound around the bead cores from the inside in the direction of width of tire to the outside in the direction of width of tire, and both ends of the inner liner extend between the bead cores and the carcass ply is also applicable.

Furthermore, in the configuration described above, a configuration in which the distortion restraining layer is provided between the bead filler and the inner liner is also applicable.

The pneumatic tire of the present invention having a structure in which the carcass ply is wound up around the bead cores from the outside in the direction of width of tire to the inside in the direction of width of tire as described above is provided with a distortion restraining layer configured to restrain distortion of the wind-up ends of the carcass ply between the bead fillers and the carcass ply so as to overlap with wind-up ends of the carcass ply, so that the wind-up ends of the carcass ply are reinforced by the distortion restraining layer, and distortion of the wind-up ends of the carcass ply may be restrained. Therefore, occurrence of separation at the wind-up ends of the carcass ply is restrained, and durability of the pneumatic tire is improved.

DESCRIPTION OF EMBODIMENTS

Figure 1:
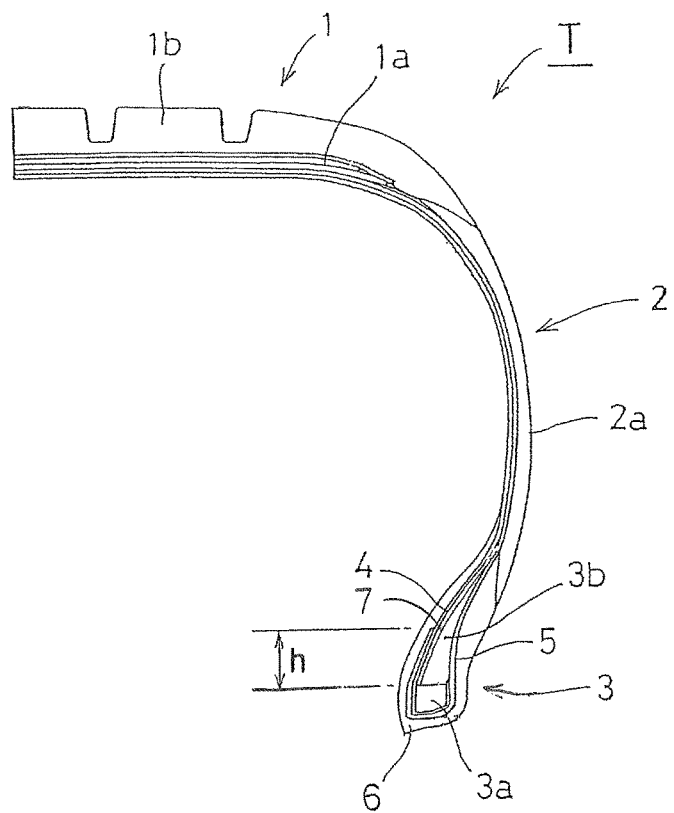
FIG. 1 is a schematic partial cross-sectional view of a pneumatic tire according to a first embodiment of the present invention.

Referring now to the drawings, a preferred embodiment of the present invention will be described below.

First Embodiment

A summary of a first embodiment is a structure in which a carcass ply is wound up from the outside in a direction of width of tire to the inside in the direction of width of tire around bead cores, an inner liner is wound up around the bead cores from the inside in the direction of width of tire to the outside in the direction of width of tire, both ends of the inner liner extend between the bead cores and the carcass ply, and rubber chafers are arranged around the bead cores.

Figure 2:
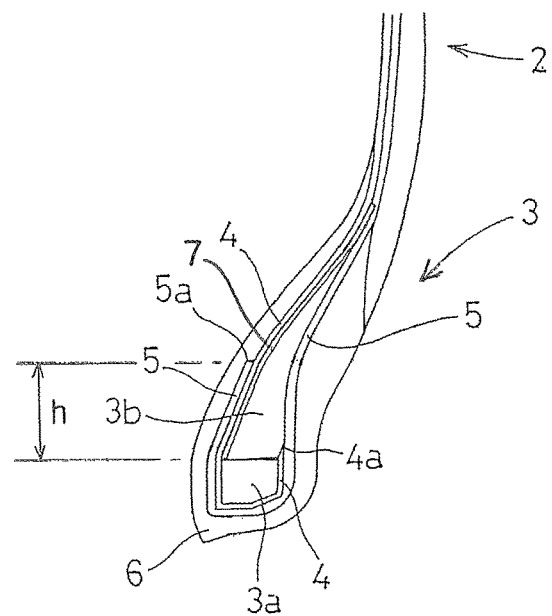
FIG. 2 is a partial enlarged view of FIG. 1.

FIG. 1 and FIG. 2 illustrate the first embodiment, and reference sign T denotes a pneumatic tire. The pneumatic tire T includes a tire tread 1, side walls 2, and beads 3. The tire tread 1 includes a belt, a belt reinforcement 1a, and a tread rubber 1b. The beads 3 each includes a bead core 3a, and a bead filler 3b formed of hard rubber extending outside in the radial direction of tire from the bead core 3a.

Reference sign 4 denotes an inner liner arranged on an inner surface of the tire, and is wound up around the bead cores 3a from the inside in the direction of width of tire to the outside in the direction of width of tire. Reference sign 5 denotes a carcass ply, and the carcass ply 5 is arranged so as to extend over the tire tread 1, the side walls 2, and the beads 3 so as to straddle between the bead cores 3a, and is wound up around the bead cores 3a from the outside in the direction of width of tire to the inside in the direction of width of tire. The inner liner 4 extends between the bead cores 3a and the carcass ply 5 at both ends thereof around the bead cores 3a.

Reference sign 6 denotes rubber chafers, and the rubber chafer 6 are arranged so as to cover the inner liner 4 and the carcass ply 5 around the bead cores 3a. Therefore, the inner liner 4 and the carcass ply 5 do not exposed to the surface of the bead 3 including winding ends 4a, 5a thereof.

Furthermore, a distortion restraining layer 7 configured to restrain distortion of the wind-up ends 5a of the carcass ply 5 is provided between the bead fillers 3b and the carcass ply 5 so as to overlap with wind-up ends 5a of the carcass ply 5. In particular, in this embodiment, the distortion restraining layer 7 is provided between the inner liner 4 provided between the bead fillers 3b and the carcass ply 5, and the bead fillers 3b.

The distortion restraining layer 7 has a structure in which at least nineteen steel cord members having a tensile strength of at least 500N per cord are arranged per inch are arranged obliquely at an angle of approximately 20 degrees in parallel in the circumferential direction of the tire, and are sandwiched between topping rubbers on upper and lower surfaces thereof. The distortion restraining layer is not limited to the above-described steel cord members, and various types of cords, for example, organic fibers such as aramid fibers having the similar strength are used.

Since the pneumatic tire T of this embodiment is configured as described above, the wind-up ends 5a of the carcass ply 5 are reinforced by the distortion restraining layer 7, so that the distortion of the wind-up ends 5a of the carcass ply 5 may be restrained. Therefore, occurrence of separation at the wind-up ends 5b of the carcass ply 5 is restrained, and durability of the pneumatic tire is improved.

In this embodiment, the distortion restraining layer 7 is disposed from a lower end which is located inside the bead fillers 3b in the radial direction of the tire to an outside in the radial direction of tire with respect to a distal end of the bead fillers 3b. The arrangement of the distortion restraining layer 7 is not limited thereto, if the distortion restraining layer 7 is disposed so as to overlap with the wind-up ends 5a of the carcass ply 5, the distortion of the wind-up ends 5a of the carcass ply 5 may be restrained. When the distortion restraining layer is arranged over at least half to 3/2 a wind-up height h of the carcass ply 5, the distortion restraining layer reliably overlap the wind-up ends 5a of the carcass ply 5, which is preferable in that the distortion of the wind-up ends 5a of the carcass ply 5 is reliably restrained. In this embodiment, since the distortion restraining layer 7 is arranged from the distal ends of the bead fillers 3b to the outside in the radial direction of tire, the rigidity of tire may be reduced step by step and, by eliminating an abrupt change in rigidity, occurrence of separation at distal ends of the bead fillers are advantageously prevented.

In this embodiment, the inner liner 4 is arranged between the carcass ply 5 and the bead cores 3a around the bead cores 3a, and both ends of the inner liner 4 extend between the bead cores 3a and the carcass ply 5. However, the invention is not limited thereto. A configuration in which the inner liner is arranged between the carcass ply 5 and the rubber chafers 6 around the bead cores 3a, and the distortion restraining layer is provided between the bead fillers 3b and the carcass ply 5 is also applicable.

Second Embodiment

In a second embodiment, an arrangement of the distortion restraining layer 7 in the first embodiment is changed, although illustration is omitted. In the first embodiment, the distortion restraining layer 7 is provided between the bead fillers 3b and the inner liner 4. However, the distortion restraining layer of this embodiment is provided between the inner liner 4 and the carcass ply 5 so as to overlap with the wind-up ends 5a of the carcass ply 5. Other configurations are the same as those in the first embodiment.

In this configuration as well, since the distortion restraining layer is provided so as to overlap with the wind-up ends 5a of the carcass ply 5 between the bead fillers 3b and the carcass ply 5, the wind-up ends 5a of the carcass ply 5 is reinforced by the distortion restraining layer, so that the distortion of the wind-up ends 5a of the carcass ply 5 may be restrained. Therefore, occurrence of separation at the wind-up ends 5a of the carcass ply 5 is restrained, and durability of the pneumatic tire T is improved.

[Comparative Test]

Subsequently, the pneumatic tire of the invention is subjected to a comparative test for the first embodiment, the second embodiment described above, and the following comparative examples 1 and 2, under the conditions described below. The result is shown in the following table 1.

Test Tire: 195/65R15 91H

Test Items

In order to evaluate the durability, a traveling distance until a breakdown of the tire is measured by a method of testing compliant to FMVSS139. Evaluation is performed with index with the result of Comparative Example 1 as 100, so that the larger the index indicates more superior durability.

Configuration of Comparative Example 1

A summary of a pneumatic tire of Comparative Example 1 is a configuration in which the distortion restraining layer is not provided in the first embodiment, and other configurations are the same as the first embodiment.

Configuration of Comparative Example 2

A summary of a pneumatic tire of Comparative Example 2 is a configuration in which the distortion restraining layer 7 in the first embodiment does not overlap with the wind-up ends 5a of the carcass ply 5. In other words, in FIG. 2, the lower ends of the distortion restraining layer 7 on the inside in the radial direction of tire are positioned on the outside in the radial direction of tire with respect to the wind-up ends 5a of the carcass ply 5. Other configurations are the same as those in the first embodiment.

TABLE 1

| | Contents | | | |
|---|---|---|---|---|
| | Comparative Example 1 | Comparative Example 2 | First Embodiment | Second Embodiment |
| | No distortion restraining layer | Distortion restraining layer and carcass ply wind-up ends do not overlap with each other | distortion restraining layer is arranged between the bead fillers and the inner liner | Distortion restraining layer is arranged between the inner liner and the carcass ply wind-up ends |
| Durability | 100 | 96 | 110 | 108 |

[Result of Comparative Test]

Durability of Comparative Example 2 in which the distortion restraining layer is provided but is not overlapped with the wind-up ends of the carcass ply is lowered in comparison with durability of the pneumatic tire in Comparative Example 1 in which the distortion restraining layer is not provided.

In contrast, the pneumatic tire in which the distortion restraining layer is arranged so as to overlap with the wind-up ends of the carcass ply between the bead filler and the inner liner of the first embodiment is significantly improved in durability in comparison with the pneumatic tire of Comparative Example 1 in which the distortion restraining layer is not provided.

The pneumatic tire in which the distortion restraining layer is arranged so that the wind-up ends of the carcass ply overlap therewith between the inner liner and the carcass ply of the second embodiment is significantly improves in durability in comparison with the tire of Comparative Example 1 although the durability is slightly lower than the pneumatic tire of the first embodiment.

From the result of the test described above, in the pneumatic tire in which the carcass ply is wound up around the bead cores from the outside in the direction of width of tire to the inside in the direction of width of tire, it was found that the durability was improved when the distortion restraining layer is provided between the bead fillers and the wind-up ends of the carcass ply.

Although several embodiments of the present invention has been described, these embodiments are intended for illustration only, and are not intended to limit the scope of the invention. These embodiments may be implemented in other various modes, and various omissions, replacements, and modifications may be made without departing from the gist of the invention. These embodiments and modifications thereof are included in the scope and gist of the invention, and are included in the invention described in Claims and a range equivalent thereto.

The invention claimed is:

1. A pneumatic tire comprising:
a pair of left and right beads each including a bead core and a bead filler;
a carcass ply extending over the bead cores; and
an inner liner arranged on an inner peripheral side of the carcass ply, wherein
the carcass ply is wound up around the bead cores from the outside in the direction of width of tire to the inside in the direction of width of tire,
a distortion restraining layer configured to restrain distortion of the winding ends of the carcass ply is provided between the bead filler and the carcass ply so as to overlap with a winding end of the carcass ply is provided,
the inner liner is wound up around the bead cores from inside in the direction of width of tire to the outside in the direction of width of tire, and
both ends of the inner liner extend between the bead cores and the carcass ply.

2. The pneumatic tire according to claim 1, wherein the distortion restraining layer is provided between the bead filler and the inner liner.

* * * * *